United States Patent [19]

Sokolovsky et al.

[11] 3,970,597
[45] July 20, 1976

[54] NOVEL SUBSTITUTED POLYAMIDES AND PROCESS FOR PRODUCING THEM

[76] Inventors: Mordechai Sokolovsky, 10 Rav Ashi St., Tel Aviv; Amihay Freeman, 21 Kiriath Sefer St., Rishon Lezion; Leon Goldstein, 21 Javits St., Rehovoth, all of Israel

[22] Filed: June 4, 1974

[21] Appl. No.: 476,320

[30] Foreign Application Priority Data
June 15, 1973  Israel.................................... 42516

[52] U.S. Cl. .............................. 260/72 N; 195/63; 195/68; 195/DIG. 11; 260/6; 260/78 SC
[51] Int. Cl.$^2$ .................. C08G 69/50; C08G 18/00
[58] Field of Search ...................... 260/72 N, 78 SC

[56] References Cited
UNITED STATES PATENTS

| | | | |
|---|---|---|---|
| 2,659,713 | 11/1953 | Magat............................... | 260/72 N |
| 3,558,562 | 1/1971 | Kramm............................. | 260/72 N |

FOREIGN PATENTS OR APPLICATIONS

| | | | |
|---|---|---|---|
| 920,213 | 3/1963 | United Kingdom............. | 260/78 SC |

*Primary Examiner*—John C. Bleutge
*Attorney, Agent, or Firm*—Browdy and Neimark

[57] ABSTRACT

Novel substituted polyamides of the general formula

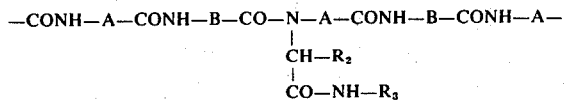

wherein A and B, which may be identical or different, are the hydrocarbon backbone groups of the formula $-(CH_2)_n-$, where n is an integer, $R_2$ and $R_3$ are the residues of an aldehyde $R_2-CHO$ or of an isocyanide $R_3-N \equiv C$, where $R_2$ and $R_3$ are aliphatic, aromatic or heterocyclic residues of the respective aldehyde or isocyanide, or where $R_3$ is a chromophoric moiety. $R_2$ and $R_3$ can be substituted, and amongst the possible substituents there may be $R_3$ designating $-(CH_2)_n-$NHCO$-CHR_2-N(CO)(R_4)-X$, where $R_4$ is the residue of a monocarboxylic or dicarboxylic acid and X is the lysyl residue of a protein, which may be biologically active, or the residue of a low-molecular weight compound containing a primary amine moiety. Preferred polyamides are various types of nylons. Amongst proteins chemically bound to the polyamide there may be mentioned enzymes, antibodies and peptide hormones. When $R_3$ is a chromophoric moiety, the product is a chemically dyed polyamide. The invention relates also to a process for the production of such novel substituted polyamides.

4 Claims, No Drawings

NOVEL SUBSTITUTED POLYAMIDES AND PROCESS FOR PRODUCING THEM

SUMMARY OF THE INVENTION

The present invention relates to novel derivatives of polyamides and especially of nylon-type polyamides. It relates more particularly to polyamides to which there have been bonded certain side-chains through which it is possible to attach to the backbone of the polymer desired functional groups, molecules imparting certain desired properties or biologically active materials, so as to result in biologically active, carrier-bound molecules. The invention further relates to a novel method for attaching to polyamides, especially to nylon-type polymers, desired side-chains, without substantially changing the average molecular weight distribution of the starting polymer. The invention also relates to a four-component reaction whereby desired side-chains are introduced into a polyamide polymer, said reaction involving the amine and carboxyl groups of the partially hydrolyzed polymer, an aldehyde and an isocyanide. Other and further aspects of the invention will become apparent hereinafter.

BACKGROUND OF THE INVENTION

In recent years biologically active materials, and especially enzymes, have been chemically and physically bonded to certain carriers, retaining the greater part of the biological activity. Such carrier bound enzymes are used repeatedly, can be filtered off easily from the substrate and are finding a wide-scale use in various applications in industry and research.

Supports used hitherto are certain synthetic polyamides, certain natural materials such as cellulose or derivatives thereof, other polysaccharides, polyacrylamide and the like.

Polyamides would of course have many advantageous properties as compared with the materials used hitherto, but due to the rather inert character of same as regards chemical reactivity, these have not been used for this purpose. Readily available polyamides have only terminal carboxy and amino groups available for such bonding and these are not adequate. Recently procedures have been described by which the binding capacity of nylons can be increased by mild hydrolysis, see Sundaram et al., (1970) FEBS Letters 10, 325 and Inman et al., (1972) Biochem.J. 129, 255. Such hydrolysis results in the partial breakup of the polymer into fragments of lower molecular weight, and this is a serious drawback.

THE PRESENT INVENTION

According to the present invention, a polyamide polymer such as any of the commercially available nylons, is subjected to controlled hydrolysis, so as to increase the number of free carboxyl and amino groups, especially on the surface of the polymer, by a factor of from about 2 to 5, as determined titrimetrically. The polymer can be used in any convenient form, such as powder, fiber, film, membrane, sheet, web of fibers, etc. Most experiments were carried out with polymer powder, but experiments have shown that the process is applicable in a similar manner to all the other forms of the polymer. After this step of controlled hydrolysis, there is effected a four-component reaction involving the carboxyl and amino groups of the polymer, which can be schematically designated as

—CONH—A—COOH    H$_2$N—A—CON-
                H—B—CONH—A— with an aldehyde R$_2$CHO and with an isonitrile R$_3$-N≡C resulting in the formation of a side chain-substituted polymer of the general formula

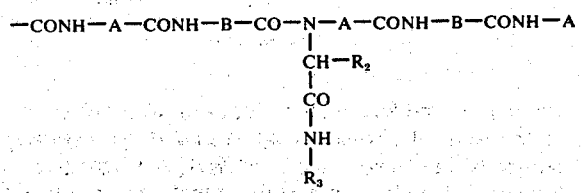

The reaction can be represented by the following formulas:

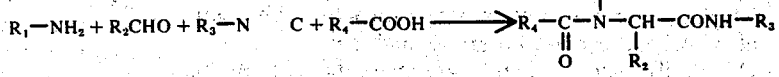

wherein the different moieties can be represented as follows:

| $R_4$——C—— | —N— | —CH— | —CONH—$R_3$ |
|---|---|---|---|
| ‖ | $R_1$ | $R_2$ | |
| O | | | |
| carboxylic acid | amine | aldehyde | isonitrile |

The derivatized polyamide is obtained by effecting first a controlled hydrolysis, followed by a reaction with an aldehyde and an isonitrile:

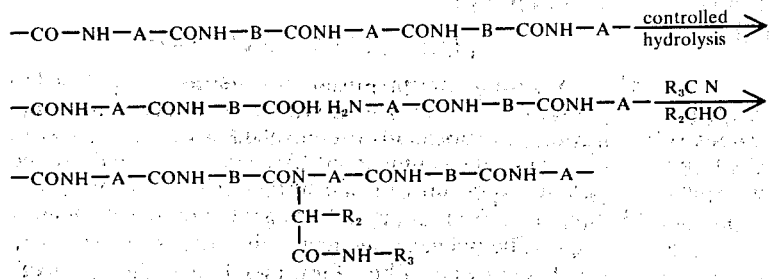

The preparation of MDA-nylon is according to the following reaction:

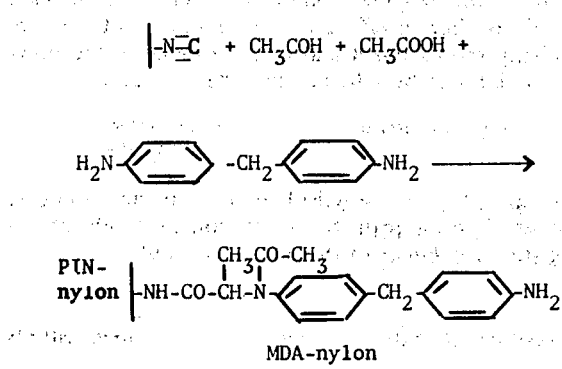

wherein $R_2$ and $R_3$ are the residues of the aldehyde and of the isonitrile, respectively. A and B are hydrocarbon-backbone residues of $-(CH_2)_n-$ where n is an integer. When $R_3$ is a reactive functional group, this can be further reacted so as to chemically bind to the polymer backbone any desired substituent, this term including biologically active molecules, or chromophores. $R_2$ and $R_3$ are any residues of aldehydes and isocyanides.

According to a preferred embodiment of the present invention, there is used a diisocyanoalkane, such as for example 1,6-diisocyanohexane, resulting in the formation of a side chain having a terminal isocyano group, which in a further reaction is again reacted with a suitable aldehyde, carboxyl-group and amino group to chemically bind a suitable group to the end of this side-chain. By using nylon-6, acetaldehyde and 1,6-diisocyanohexane, a derivative of nylon designated as PIN-nylon is obtained, as set out in detail hereinafter, which is advantageously used for the chemical binding of various substituents, molecules, etc. as will be described in detail hereinafter.

As is well known, the chemistry of the various polyamides is very similar, especially as regards the reactivity of partially hydrolyzed polymers having reactive carboxyl and amino groups. In view of this the invention is illustrated mainly with reference to nylon 6, it being clearly understood that this is by way of example only and that the present invention is applicable to other polyamides with no, or only minor changes of procedure, as will be self-evident to any person versed in the art.

MATERIALS AND METHODS

Preparation 1: Isocyanides

The general synthetic procedure adopted was based on the conversion of a primary amine into the appropriate N-Alkyl formamide by treatment with ethyl formate, followed by dehydration to the isocyanide (Ugi I, Fetzer U, E Holzer U, Kupfer H. and Offerman K - Angew Chem. Int. Ed. 4 472 (1965)).

a. N-formyl cyclohexylamine was prepared as described by Ugi (Ugi I (1961) Organic Synthesis 41 13-14).

IR spectrum in chloroform $\nu_{max}$: 1460 (alicyclic-$CH_2$-) 1680 (amide CO) 2860, 2940 (aliphatic-$CH_2$-) 3420 (-CH-), 3700 (amide NH).

b. Cyclohexyl isocyanide was prepared from the formamide by dehydration with cyanuric chloride according to Wittman (R. Wittman, (1961) Angew, Chem. 73 219).

IR spectrum in chloroform $\nu_{max}$: 1460 (alicyclic $CH_2$) 2170 (N $\equiv$ C), 2860, 2950 (aliphatic $CH_2$) 3420 (CH)cm$^{-1}$.

c. N,N' diformyl — (1,6-diaminohexane) was prepared essentially as described by Moffat et al (J. Moffat, M. V. Newton and G. J. Papenmeier (1962) J.Org.Chem. 27, 4058). Mt.Pt. 105°C.

IR spectrum in chloroform, $\nu_{max}$: 1680 (amide CO), 2840, 2920 (aliphatic CH)cm$^{-1}$.

d. 1,6-diisocyanohexane was prepared by dehydration of N,N'-diformyl-(1,6-diaminohexane) with p-toluene sulfonyl chloride, essentially as described by Heztler and Covey (N. R. Heztler and E. J. Corey (1918), J. Org. Chem. 23 1222).

IR spectrum in chloroform: 1440 (aliphatic $CH_2$), 2130 (N $\equiv$ C), 2840, 2920 (aliphatic $CH_2$). NMR in $CDCl_3$: Hydrogen ratio 2:1 (corresponding to 8:4); $\alpha$-$CH_2$:$\tau$=6.70 (tt); $J_{NH}$=2cps; $\beta$-$CH_2$:$\tau$=8.36 (multiple splitting); $\gamma$-$CH_2$:$\tau$=8.52 (multiple splitting) (Kurtz et al, 1961).

e. p-Nitrophenyl isocyanide p-nitroaniline (5 gms; 0.036 mole) and potassium-t-butoxide (20 gms; 0.18 mole) were dissolved with stirring in t-butanol (1 liter). Chloroform (8 ml: 0.07 mole) was then added dropwise and the reaction allowed to proceed with stirring for 1 hr. Benzene (200 ml) and water were added until phase separation occured. The benzene phase was separated. The aqueous phase was extracted with two 100 ml portions of benzene. The combined benzene extract was washed with water and concentrated to a final volume of about 100 ml. in a rotatory evaporator. The concentrated benzene solution was passed through an activated-alumina column (2.5 × 25 cm), the yellow-orange fractions collected and evaporated to dryness. The yellowish brown solid (3.5 gms; 60% yield) was stored in a closed vessel, at $-5°$.

IR in chloroform:$\nu$max: 2130, 1680, 1610, 1580, 1370, 1330 cm$^{-1}$.

f. Preparation of succinyltrypsin

Trypsin (250 mg) was dissolved in cold half-saturated sodium acetate (6 ml), and the solution adjusted to pH 8. Succinic anydride (600 mg) was in the course of 1 hr. to the ice-cooled enzyme solution the pH being maintained at 8 with an automatic titrator using 2N NaOH as titrant. The reaction mixture was exhaustively dialyzed against distilled water at 4° and lyophilized (net weight of lyophilized powder 235 mg). Determination of the free amine nitrogen by the Van Slyke method indicated that 13 out of the 14 lysyl residues of trypsin had been succinylated. The specific activity of the succinyl trypsin sample was 20 esterase units/mg as compared with 35 esterase units/mg for native trypsin.

ASSAY METHODS

Preparation 2: Nylon-6 powder

Stage A: Preparation

Commercial Nylon-6 pellets (30 gms) were suspended in a 20% solution of anhydrous $CaCl_2$ in methanol (1 liter) and stirred at room temperature until a homogeneous, extremely viscous solution was obtained. (K. Fabel, Kunststoffe 37, 197 (1947)). The nylon solution was added dropwise with strong stirring into large excess of water (at least 8 liters water per liter nylon solution); the powder was separated on a suction filter, washed with water (1 liter) resuspended in water (5 liters) and homogenized with an Ultraturax Homogenizer (janke & Kunkel KG, Staufen i.Br.) The fine powder was separated, washed again with water, ethanol and ether and air dried. Traces of solvent and moisture were removed in a vacuum dessicator over phosphorous pentoxide. The mean diameter of the nylon powder particles as determined by examination under the microscope was $0.5-1\mu$. The mean carboxyl-content of the Nylon powders, determined titrimetrically, was about $25\mu$ moles per gm. dry nylon powder.

Stage B: Determination of the Carboxyl Content of Nylon Powders

The carboxyl content of the nylon powder samples (50 mg) was determined by anhydrous titration with sodium methoxide (Patchornik A. and Ehrlich-Rogozinski S. (1959) Anal.Chem.31 985).

ASSAY METHODS

The enzymic activities of trypsin, succinyl trypsin and papain and of their water insoluble derivatives were determined at 25° by the pH-stat method (K. A. Walsh and P. E. Wilcox (1970) Methods Enzymol.19 31). The substrate solutions (5 ml) were $1.5 \times 10^{-2}$ M benzoyl-L-arginine ethylester 0.05M KCl for trypsin and succinyl trypsin (Laskowski M. (1955) Methods Enzymol.2 26) and 0.05M benzoyl-L-arginine ethylester 0.005 crystein, 0.002 EDTA for papain (Smith E. L. and Parker M. J. (1958) J. Biol. Chem. 233 1387). The titrant was 0.1N NaOH. The assays were carried out at pH 8 for trypsin, at pH 9 for succinyl trypsin, at pH 9.5 for immobilized trypsin and succinyl trypsin at pH 6.5 for papain and at pH 7 for immobilized papain. One unit of esterase activity was defined as that amount of enzyme which catalyzed the hydrolysis of $1\mu$ mole of substrate per min under the specified assay conditions.

The specific activities of the native enzyme samples used were as follows: trypsin -32.5 esterase units/mg; succinyltrypsin - 20 esterase units/mg; papain -16 esterase units/mg.

The enzyme activity of crystalline pepsin and of the immobilized pepsin derivatives were determined at 37° by the hemoglobin digestion method (Anson M. L. 1938; J.Gen.Physiol. 22,79). The reaction mixtures containing immobilized enzyme were stirred magnetically to ensure effective mixing of the reagents.

EXAMPLE 1

Controlled Hydrolysis of Nylon Powders

Nylon-6 powder (10 gms) was suspended in 3N HCl (300 ml) and stirred at room temperature (20°) for the desired amount of time. The powder was separated on a suction filter, washed exhaustively with water, ethanol, ether and air dried. Traces of solvent and moisture were removed in a vacuum dessicator over phosphorous pentoxide and the powders stored in closed vessels.

The dependence of the carboxy content of nylon-6 powder on the time of hydrolysis is summarized in the attached Table, for a typical set of experiments. The Nylon-6 samples routinely used were hydrolyzed for 4 hours.

| Controlled Hydrolysis of Nylon-6 Powders | | | | | | | |
|---|---|---|---|---|---|---|---|
| Time of hydrolysis (hours) | 0 | 2 | 4 | 6 | 17 | 21 | 24 |
| Carboxyl content ($\mu$moles/gm) | 26 | 55 | 65 | 70 | 91 | 96 | 104 |

In a similar manner a partial hydrolysis was effected with nylon-6,6 in powder form and with nylon-11 (Rilsan;TM), the results being as follows: Nylon 6,6; unhydrolysed — $30\mu$ moles/gm; 4 hrs. hydrolysis — $70/80\mu$ moles/gm. Nylon 11: unhydrolyzed — $10\mu$ moles/gm; 4 hrs. hydrolysis — $35-40\mu$ moles/gm; 7 hrs. hydrolysis — $60-70\mu$ moles/gm.

Similar experiments were carried out with nylon fibers, with thin sheets of nylon-6, nylon netting, etc. The reaction was carried out under similar conditions and also in these cases an increase of titrimetrically determinable carboxyl groups by a factor of from about 2 to 5 as compared with untreated material, was attained.

EXAMPLE 2

Attachment of side-chains to partially hydrolyzed nylon

Partially hydrolyzed nylon powder, 50 mg (sample hydrolyzed for 4 hrs; mean carboxyl content $62.5\mu$ moles/gm) was suspended in 2 ml isopropanol. The suspension was stirred and 0.5 ml of an aldehyde and 0.2 ml of an isocyanide were added and the reaction allowed to proceed at room temperature with stirring for 24 hours. The nylon powder was separated on a suction filter, washed with ether (50 ml) and air-dried. The dry nylon powder was transferred quantitatively to a stoppered vial, and the carboxyl content determined as described in the experimental section. The results are summarized in the following Table.

Similar results were obtained with Nylon-11 powder (Rilson Powder) and with Nylon 6,6.

FOUR COMPONENT CONDENSATION REACTIONS WITH PARTIALLY HYDROLYZED NYLON POWDERS

| Exp. No. | Reaction Mixture | | | Carboxyl Content | |
|---|---|---|---|---|---|
| | Nylon Powder | Aldehyde | Isocyanide | $\mu$moles/gm. | % of Reference |
| 1. | Non-hydrolyzed | — | — | 24.2 | 100 |
| 2. | Partially hydrolyzed | — | — | 62.5 | |
| 3. | Partially hydrolyzed | Acetaldehyde | Cyclohexyl isocyanide | 21.4 | 134.3 |
| 4. | | Acetaldehyde | 1,6-diisocyanohexane | 16.9 | 27.1 |
| 5. | | Benzaldehyde | Cyclohexyl isocyanide | 54.0 | 86.5 |
| 6. | | Glutaraldehyde | Cyclohexyl isocyanide | 60.0 | 96.0 |
| 7. | | Acetaldehyde | — | 56.6 | 90.5 |
| 8. | | Benzaldehyde | — | 55.0 | 88 |
| 9. | | Glutaraldehyde | — | 59.2 | 94.2 |
| 10. | | — | Cyclohexyl isocyanide | 52.3 | 83 |
| 11. | | — | 1,6-diisocyanohexane | 56.5 | 90.5 |

EXAMPLE 3

Preparation of Polyisonitrile Nylon (PIN-nylon)

Partially hydrolyzed nylon-6 powder, 2 gms (sample hydrolyzed for 4 hours; mean carboxyl content 60–65$\mu$ moles/gm.) was suspended in isopropanol (80 ml); acetaldehyde (20 ml) was then added, followed by 1,6-diisocyanohexane (8 ml) and the reaction allowed to proceed in a closed vessel for 24 hours with stirring at room temperature. The acetaldehyde was pipetted with a precooled pipette, to prevent formation of bubbles. The PIN-nylon powder was separated on a suction filter, washed with isopropanol (50 ml) and then with ether (200 ml) and air dried. Traces of solvent were removed in a vacuum dessicator over phosphorous pentoxide. The PIN-nylon powder was stored at −5° in a dark stoppered vial over silica gel. The coupling capacity of PIN-nylons were 25–50$\mu$ moles/gm. (see Example 6).

EXAMPLE 4

Preparation of MDA-nylon p,p′-diaminodiphenylmethane, MDA (2 gms, 0.01 mole) was dissolved in 160 ml. 100 propanol cooled over ice and 4 ml acetaldehyde were then added. PIN-nylon powder (2 gms) was suspended in 160 ml isopropanol, 2 ml glacial acid (0.033 moles) were added, followed by the MDA-acetaldehyde solution. The reaction was allowed to proceed in a closed vessel for 24 hours. with stirring at room temperature. The MDA-nylon was separated on a suction filter, washed with ethanol and then with ether and air dried. The coupling capacity of the MDA-nylon was 20$\mu$ moles/gm. (see Example 12).

EXAMPLE 5 p-Nitrophenyl nylon p-nitrophenyl isocyanide (200 mg; 0.00135 mole) was dissolved in 2 ml acetone, cooled over ice and 2 ml. acetaldehyde were added. Partially hydrolyzed nylon-6 powder (100 mg) was then added and the reaction mixture stirred overnight at room temperature in a tightly closed vessel. The yellow powder was washed with acetone, ether and air-dried. The p-nitrophenyl content estimated from the amount of p-nitroaniline, obtained following total acid hydrolysis of p-nitrophenyl-nylon was 30$\mu$ mole/gm.

EXAMPLE 6

Coupling of Trypsin to PIN-nylon

PIN-nylon (50 mg) was suspended in 2 ml cold 0.1M phosphate 0.5M Sod. Acetate pH 8. A cold aqueous solution of trypsin (6 mg in 1 ml) was then added, followed by 0.1 ml acetaldehyde. The reaction mixture was left stirring overnight at 4°. The insoluble enzyme derivative was separated on a filter, washed with water, 1M KCl 0.1M in NaHCO$_3$ and again with water, resuspended in water (4 ml) and stored at 4°. The recovery of immobilized enzymic activity was 35%.

EXAMPLE 7

Succinyltrypsin-nylon

PIN-nylon (50 mg) was suspended in 1.0 ml cold 0.1 M Tris buffer pH 7.0. A cold solution of succinyltrypsin in the same buffer (2–10 mg in 1 ml) was added, followed by 0.1 ml acetaldehyde. The reaction mixture was left stirring overnight at 4°, washed and resuspended in water as described for trypsin-nylon.

Maximal recoveries of immobilized enzymic activity (30–40% of the amount added to the reaction mixture) were obtained for succinyltrypsin with 4–5 mg enzyme per 100 mg support.

EXAMPLE 8

Pepsin-nylon

PIN-nylon (50 mg) was suspended in 2 ml cold 0.1M Tris adjusted to pH 5 and 2–10 mg pepsin added. After the enzyme had dissolved 0.1 ml acetaldehyde[2] was added. The reaction mixture was left stirring overnight at 4°. The insoluble pepsin derivative was washed with 0.01 N HCl, resuspended in 0.001N HCl (3–4 ml) and stored at 4°.

EXAMPLE 9

Coupling of low molecular weight amines to PIN-nylon

PIN-nylon (50 mg) was suspended in 2 ml 0.1M phosphate 1M Sodium Acetate pH 8. An aqueous solution of benzoylglycyl-lysine (hippuryllysine) (5 mg in 1 ml) was then added followed by 0.1 ml acetaldehyde. The reaction mixure was left stirring overnight at room temperature. The insoluble benz-gly-lys-nylon conjugate was exhaustively washed with water, ethanol, ether and air-dried. The glycine content of benz-gly-Lys-nylon as determined by amino acid analysis of an acid hydrolyzate, was about 25$\mu$ mole/gm.

EXAMPLE 10

Diazotization of MDA-nylon

MDA-nylon (100 mg) was suspended in cold 0.2N HCl (7 ml) and aqueous sodium nitrite (25 mg in 1 ml) added dropwise. The reaction mixture was stirred for 30 min. over ice; the red brown diazotized MDA-nylon was separated on a suction filter, washed with cold water and finally with cold 0.1M phosphate, pH 8, resuspended in the same buffer and used directly in the coupling experiments.

EXAMPLE 11

Coupling of papain to MDA-Nylon

An aqueous solution of papain (10 ml 1–1.3 mg protein per ml) was added to a magnetically stirred suspension of diazotized MDA-nylon (Example 10) in 0.1M phosphate buffer pH 8 (100 mg in 6 ml). The reaction mixture was left stirring overnight at 4°. The insoluble MDA-nylon papain conjugate was separated by filtration, washed with water, 1M KCl and again with water, resuspended in water (5 ml) and stored at 4°. The recovery of immobilized enzymic activity was about 40%.

EXAMPLE 12

Coupling of p-bromophenol to MDA-nylon

An aqueous solution of p-bromophenol (50 mg dissolved in 3 ml water by the dropwise addition of 2N NaOH) was added to a diazotized MDA-nylon sample (50 mg) suspended in cold 0.1M phosphate buffer pH 8 (6 ml). The reaction mixture was left stirring overnight at 4°. The red-brown p-bromophenol-MDA-nylon conjugate was separated on a funnel, washed with 0.05 M carbonate buffer pH 10.5 or water brought to the same pH, then with deionized water and finally with methanol and ether and dried in vacuum over phosphorous pentoxide. The diazotization capacity of MDA-nylon could be estimated from the bromine content of the p-bromophenol conjugate.

EXAMPLE 13

Dyeing of MDA-nylon

Diazotized MDA-nylon (nylon 6) (50 mg) was suspended in cold 0.1M phosphate buffer pH 8(6 ml). A saturated aqueous solution of chromotropic acid sodium salt (4,5-dihydroxy-2,7-naphthalene disulfonic acid; 1 ml) was added and the reaction mixture left stirring overnight at 4°. The chromotripic acid/MDA-nylon conjugate was washed with water, methanol, ether and air-dried.

Analogous procedures were employed to couple diazotized MDA-nylon with 2-naphthol-3,6-disulfonic acid and with pyrogallol (1,2,3-trihydroxybenzene). The colours of the azo derivatives thus obtained were as follows: Chromotropic acid-MDA-nylon . . . violet 2-naphthol-3,6-disulfonic acid/MDA-nylon . . . pink pyrogallol/MDA-nylon . . . light yellow.

Examples 3 to 13 were repeated with other types of nylon, namely with nylon 11 and with nylon 6—6, and similar results were obtained.

We claim:

1. A process for preparing substituted polyamides of the general formula

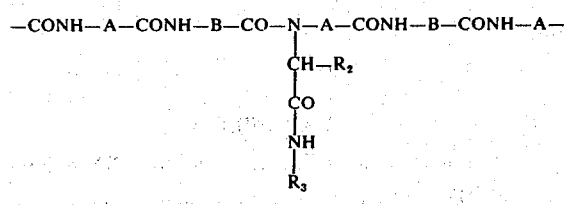

wherein A and B, which may be identical or different, are the hydrocarbon backbone groups of the general formula $—(CH_2)_n—$, where n is an integer, $R_2$ and $R_3$ are residues of an aldehyde $R_2$-CHO or an isocyanide $R_3$-N = C, where said aldehyde is an aliphatic aldehyde and said isocyanide is a diisocyanoalkane, which comprises:
  a. partially hydrolyzing the amide bonds on the surface of a polyamide; and
  b. resealing the carboxy- and amino- groups formed by said hydrolysis by reacting with said aldehyde, $R_2$-CHO, and with said isocyanide, $R_3$-N = C, resulting in a polyamide of a molecular weight substantially identical with that of the starting material before the partial hydrolysis, substituted by sidechains on the nitrogen of the newly formed peptide bond.

2. A process as claimed in claim 1, wherein said aliphatic aldehyde is acetaldehyde and the product is PIN-polyamide.

3. A process as claimed in claim 2, wherein the polyamide is nylon and the product is PIN-nylon.

4. A process as claimed in claim 1, wherein sad diisocyanoalkane is 1,6-diisocyanohexane.

* * * * *